3,040,106
1,4,5,6,7,7-HEXACHLORO-2-ETHYLBICYCLO-
(2.2.1)-HEPTENE-5
Paul E. Hoch, Youngstown, N.Y., assignor to Hooker
Chemical Corporation, Niagara Falls, N.Y., a corporation of New York
No Drawing. Filed Dec. 19, 1958, Ser. No. 781,468
2 Claims. (Cl. 260—648)

This invention relates to a new composition of matter. More particularly this invention relates to the new chemical 1,4,5,6,7,7-hexachloro-2-ethylbicyclo-(2.2.1)-heptene-5 having a boiling point of 86–87 degrees centigrade at 0.1 millimeter pressure, an empirical formula of $C_9H_8Cl_6$ and having a chlorine analysis of 64.3 percent.

The compound of the present invention may be prepared by the hydrogenation of 1,4,5,6,7,7-hexachloro-2-ethynylbicyclo-(2.2.1)-heptene-5. More particularly the compound of the present invention may be prepared by the catalytic hydrogenation of 1,4,5,6,7,7-hexachloro-2-ethynylbicyclo-(2.2.1)-heptene-5 in the presence of a suitable solvent. The reaction may be represented as follows:

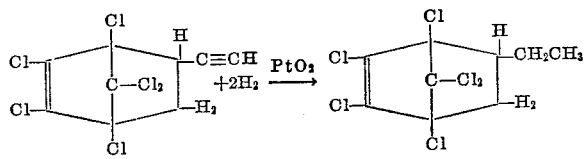

The starting material is disclosed and claimed in copending application S.N. 781,469, filed on even date herewith. Said starting material is prepared by the dehydrohalogenation of 1,4,5,6,7,7 - hexachloro - 2 - (1,2 - dichloroethyl)bicyclo - (2.2.1) - heptene - 5. 1,4,5,6,7,7 - hexachloro - 2 - (1,2 - dichloroethyl)bicyclo - (2.2.1) - heptene-5 may be prepared by the Diels-Alder adduction of hexachlorocyclopentadiene as the diene and either trans, 1,4-dichlorobutene-2 or 3,4-dichlorobutene-1 as the dienophile.

In the preparation of the compound of the present invention, a solvent should be employed. The solvent that is employed should be inert with respect to the reactants and reaction products and have a sufficiently high boiling point to allow for reaction at elevated temperatures without necessitating the application of above atmospheric pressure. It is preferred to use ethanol or methanol as a solvent; however, the others which may be employed include, for example, dioxane, n-butanol, butyl Cellosolve, methyl Cellosolve, diethyl Carbitol, tertiary butyl alcohol, normal amyl alcohol and tertiary amyl alcohol.

Any standard hydrogenation procedure may be employed. In the hydrogenation any reducting catalyst which is commonly employed for low pressure hydrogenation may be used, but the preferred hydrogenation catalysts are platinum oxide or palladium oxide. The time of hydrogenation reaction should be continued until the proper amount of hydrogen is absorbed, i.e. about 2 mol equivalents.

The product may then be separated by any procedure known in the art; for example, the catalyst and solvent may be removed by filtration and distillation respectively and the product distilled off.

The compound of the present invention finds utility as an insecticide, fungicide and miticide. The compound of the present invention may also be used as a flameproofing agent. In addition the compound of the present invention may be used as a chemical intermediate.

The following examples are given to illustrate this invention and are not to be construed as limiting the invention except as defined in the appended claims.

Example 1

99 grams of liquid 1,4,5,6,7,7-hexachloro-2-(2,3-dichloroethyl)-bicyclo-(2.2.1)-heptene-5 was dissolved in 300 cubic centimeters of ethanol. This solution was warmed with stirring to about 50 degrees centigrade. To the warmed solution was added an alcohol solution containing 34 grams of potassium hydroxide (85 percent by weight). Addition was made in 1¼ hours. The reaction mixture was stirred at reflux for an additional 4 hours. The reaction mixture thus obtained was poured into water and extracted with methylene dichloride. After washing the organic layer and drying the solution over magnesium sulfate, the solvent was stripped and the residual oil fractionated. The compound 1,4,5,6,7,7-hexachloro-2-ethynylbicyclo-(2.2.1)-heptene-5 was obtained boiling at 103 to 106 degrees centigrade at 1.5 millimeters pressure. The compound had empirical formula of $C_9H_4Cl_6$ and the chlorine analysis was 65.6 percent calculated; 66.0 percent found.

Example 2

A 500 centimeter pressure bottle was charged with 16.7 grams of 1,4,5,6,7,7-hexachloro-2-ethnylbicyclo-(2.2.1)-heptene-5, 160 centimeters of ethanol and 0.05 gram of platinum oxide. The pressure bottle was then placed in a shaker and after removal of the air present, the solution was subjected to hydrogenation at 38 pounds per square inch hydrogen. The hydrogenation was continued until 8 pounds of hydrogen were absorbed (2 mol equivalents). The contents of the flask were filtered and after evaporating the alcohol solvent, the oily product, 1,4,5,6,7,7 - hexachloro - 2 - ethylbicyclo - (2.2.1) - heptene-5, was distilled. The product had a boiling point of 86 to 87 degrees centigrade at 0.1 millimeter pressure, had an empirical formula of $C_9H_8Cl_6$ and had a chlorine analysis of 64.8 percent calculated; 64.3 percent found.

Example 3

5 grams of 1,4,5,6,7,7 - hexachloro - 2 - ethylbicyclo - (2.2.1)-heptene-5 were dissolved in 10 grams of a co-polymerizable composition consisting of 44 percent styrene, and 56 percent of a polyester consisting of 1 mol of phthalic anhydride, 1 mol of fumaric acid and 2 mols of ethylene glycol. One percent of benzoyl peroxide was added as a polymerization catalyst. The resulting mixture was placed in a circulating oven at 80 degrees centigrade for about 18 hours. A clear resin was obtained which was self-extinguishing when ignited.

It is to be understood that the invention is not limited to the specific examples which have been offered merely as illustrative, and that modifications may be made within the scope of the appended claims without departing from the spirit of the invention.

I claim:
1. The process for preparing 1,4,5,6,7,7-hexachloro-2-ethylbicyclo-(2.2.1)-heptene-5 which comprises subjecting 1,4,5,6,7,7 - hexachloro - 2 - ethynylbicyclo - (2.2.1) - heptene-5 to hydrogenation in the presence of a catalyst selected from the group consisting of platinum oxide and palladium oxide and a solvent selected from the group consisting of methanol, ethanol, dioxane, n-butanol, butyl Cellosolve, methyl Cellosolve, diethyl Carbitol, tertiary butyl alcohol, normal amyl alcohol and tertiary amyl alcohol.
2. The process for preparing 1,4,5,6,7,7-hexachloro-2-ethylbicyclo-(2.2.1)-heptene-5 which comprises subjecting 1,4,5,6,7,7 - hexachloro - 2 - ethynylbicyclo - (2.2.1) - heptene-5 to hydrogenation in the presence of platinum oxide and ethanol and continuing the reaction until two mols of hydrogen per mol of organic reactant are reacted.

References Cited in the file of this patent

UNITED STATES PATENTS

| | | |
|---|---|---|
| 2,697,124 | Mantell | Dec. 14, 1954 |
| 2,881,223 | Schmerling | Apr. 7, 1959 |
| 2,897,240 | Maltosky | July 28, 1959 |

FOREIGN PATENTS

| | | |
|---|---|---|
| 80,063 | Netherlands | July 15, 1955 |

OTHER REFERENCES

Egloff: "Reactions of Pure Hydrocarbons," pp. 430–1 (1937).

Berger et al.: "Zeitschrift für Naturforschung," vol. 9b, p. 684 (1954).